April 23, 1940.  H. ROLAND ET AL  2,197,898
AUTOMATIC GYROSCOPIC CONTROL APPARATUS FOR VEHICLES
Filed Sept. 29, 1937    2 Sheets-Sheet 1
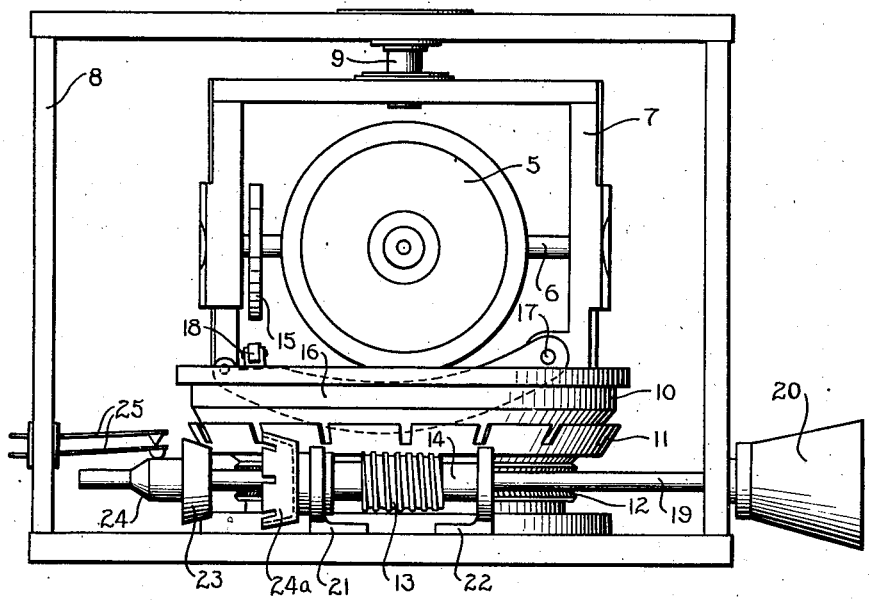
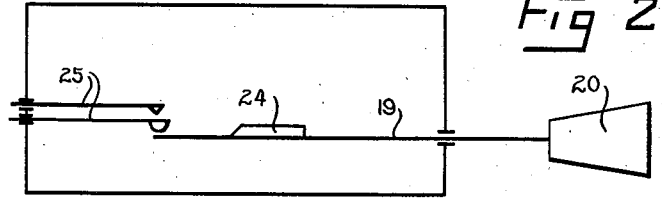
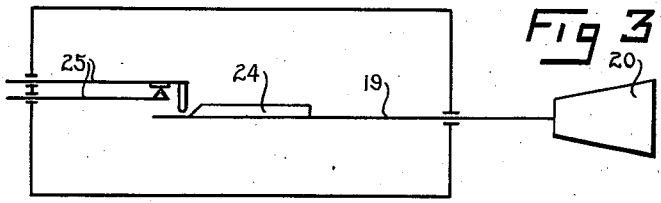
INVENTOR.
Heinrich Roland
Johannes Thiry
BY Stephen Cerstvik
ATTORNEY April 23, 1940.   H. ROLAND ET AL   2,197,898
AUTOMATIC GYROSCOPIC CONTROL APPARATUS FOR VEHICLES
Filed Sept. 29, 1937   2 Sheets-Sheet 2
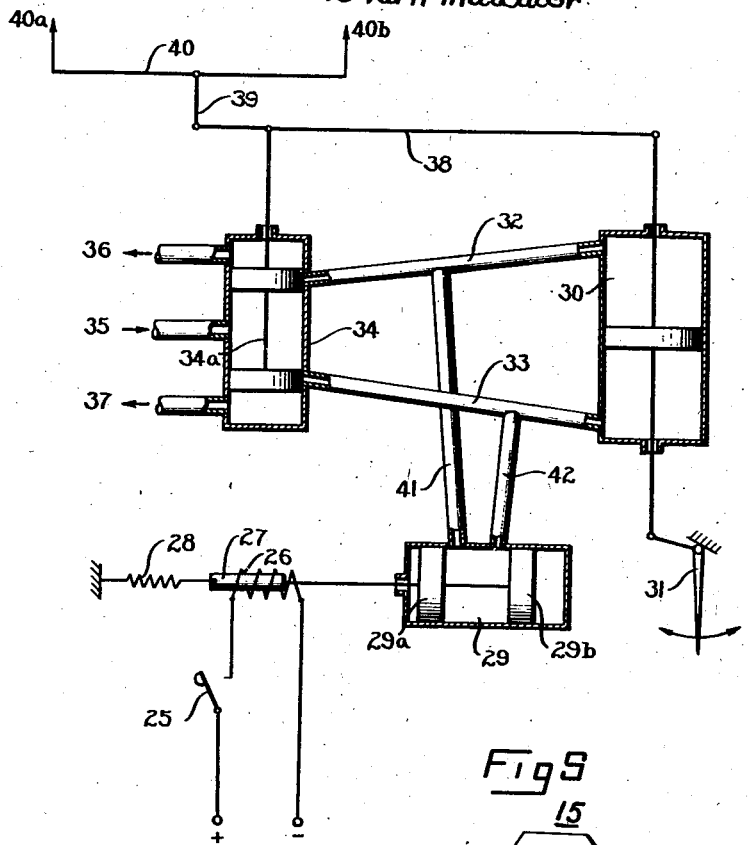
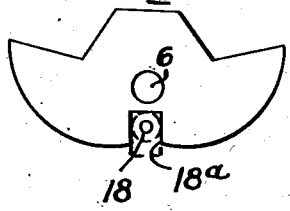
INVENTOR.
Heinrich Roland
Johannes Thiry
BY Stephen Cerstvik
ATTORNEY.

Patented Apr. 23, 1940

2,197,898

UNITED STATES PATENT OFFICE 2,197,898

AUTOMATIC GYROSCOPIC CONTROL APPARATUS FOR VEHICLES

Heinrich Roland, Berlin-Steglitz, and Johannes Thiry, Berlin-Charlottenburg, Germany, assignors to Siemens Apparate und Maschinen Gesellschaft mit beschränkter Haftung, Berlin, Germany, a corporation of Germany Application September 29, 1937, Serial No. 166,414 In Germany September 30, 1936

4 Claims. (Cl. 244—76)

This invention relates to automatic gyroscopic control apparatus for vehicles, and particularly to such apparatus for aircraft.

In navigating aircraft by means of automatic gyroscopic control apparatus, it is often necessary to quickly shift from one course to another or to execute quick turns. For this purpose, it is first of all necessary to disconnect the automatic control device and simultaneously to prevent motion of the gyroscope upon its precessional axes or to fix said axes. By fixing the precessional axes the wandering of the gyroscope is avoided during the rapid changes of attitude of the aircraft. However, as soon as the pilot has again set the craft upon its course, it may continue thereon automatically after the freedom of the gyroscope has been restored and the automatic control device reconnected.

Devices heretofore proposed for disconnecting automatic course control apparatus and for fixing the axes of the gyroscope employed therewith have been complicated in nature and arrangement.

One of the objects of the present invention is to provide novel simplified means, in an automatic course control apparatus, for disconnecting the automatic control arrangement and for fixing the axes of the gyroscope connected therewith.

Another object of the invention is to provide easily accessible and operable means for disconnecting the automatic control device and for fixing the axes of the gyroscope employed therewith.

Another object is to provide means for disconnecting the automatic control apparatus in such a manner that it will not interfere with the manual control of the vehicle.

The above and further objects and novel features will more fully appear from the following detailed description when the same is taken in connection with the accompanying drawings. It is to be expressly understood, however, that the drawings are for the purpose of illustration only and are not intended as a definition of the limits of the invention, reference for this latter purpose being primarily had to the appended claims.

In the drawings, wherein like reference characters refer to like parts throughout the several views, Fig. 1 is a side elevation illustrating one embodiment of the present invention;

Fig. 2 is a schematic diagram of the switching means as shown in Fig. 1;

Fig. 3 is a schematic diagram of a second embodiment of the switch means;

Fig. 4 is a schematic diagram of the switching and automatic control means; and

Fig. 5 is a detailed view of the locking elements of Fig. 1.

The form of the invention illustrated in the accompanying drawings by way of example is a device providing means for disconnecting and connecting the automatic control apparatus for an aircraft and for controlling the freedom of the axes of the gyroscope which transmits directional values to the control apparatus. The device comprises a manually operable plunger which is adapted for simultaneously actuating the automatic control apparatus switching means and the gyroscope axis fixing mechanism. The switching means controls a solenoid which, in turn, governs the action of a coupling valve which is adapted for neutralizing or energizing a servomotor. The servo-motor is directly connected to the vehicle control surfaces.

In the form illustrated in Fig. 1, means are provided for establishing or fixing the axes of a gyroscope 5 mounted upon a horizontal axis 6 in a Cardan ring 7 which, in turn, is mounted upon frame 8 by means of vertical shaft 9. The establishing means for the vertical axis 9 comprises a cone clutch, the conical ring 10 of which is attached to the Cardan ring 7 and the clutch rim 11 of which is mounted within a worm wheel 12 and adapted, by means of a key connection (as shown in detail in copending application of Heinrich Roland, 185,758, filed January 19, 1938) for longitudinal movement in the direction of the vertical axis 9 and also for rotary motion with worm wheel 12 which is rotatably mounted upon the frame 8. A worm gear 13 upon a shaft 14 meshes with wheel 12 and serves to adjust the vertical axis in azimuth when said clutch is in operation in a manner to appear hereinafter.

The fixing means for the horizontal axes 6 comprises a curved plate 15 attached thereto. An arm 16 pivotally mounted upon frame 7 at 17 coacts with said curved plate and upon establishment of the axes pivots upward as described in detail in copending application of Heinrich Roland, 185,758 such that a roller 18 mounted upon the arm falls into a catch 18a (see Fig. 5) milled in plate 15 gripping the same and thus holding the axes 6 stationary.

The actuating of the fixing means results from the longitudinal displacement of a plunger 19 to which a knob 20 is attached for manual operation. The plunger 19 is rotatably mounted within the hollow shaft 14 which, in turn, is rotatably mounted in blocks 21 and 22 attached to the frame 8. Longitudinal displacement of said plunger moves a cam member as described in the above copending application which thrusts clutch rim 11 and arm 16 into the operating position which immediately establishes the vertical and horizontal axes, respectively.

Means are provided to turn worm 13 for vertical axis azimuth adjustment comprising a cone coupling which is engaged when the plunger 19 is displaced longitudinally and the axes are established. The cone coupling is constituted by a cone member 23 attached to said plunger and a rim member 24a attached to the hollow shaft 14.

Novel means are provided for connecting and disconnecting the fluid pressure operated automatic control apparatus, to be hereinafter explained, comprising a cam mechanism attached to and operable upon longitudinal displacement of plunger 19. The cam means is adapted for controlling switching means which governs said automatic apparatus and, for example, is constituted by a frustro-conical or a wedge portion 24 which is adapted to open and close a switch 25 when said plunger is displaced. It should be noted that the establishing of the axes of the gyroscope and the disconnecting of the automatic control apparatus occurs approximately simultaneously. Fig. 2 illustrates the plunger 19 in the position which it assumes when the axes of the gyroscope 5 are established and the automatic control apparatus disconnected. In this embodiment, the wedge 24 must be so placed upon the plunger 19 that it does not close the switch 25 until immediately after the precession axes have been released. In the embodiment shown in Fig. 3, the plunger is in the position which it assumes when the automatic apparatus is connected and the gyroscope axes are free. In this embodiment, the wedge 24 is also located upon the plunger 19 in such a manner that switch 25 does not close until immediately after the precession axes have been released.

In the schematic diagram shown in Fig. 4, the novel control means are further illustrated comprising switch 25 connected to solenoid 26, the armature 27 of which is normally withdrawn to an inoperative position by a spring 28. Armature 27 is operatively connected to a novel coupling valve 29 which is, upon closing of the switch 25, adapted for moving valve pistons 29a and 29b to such a position, to be later explained, that the fluid pressure to a servo-motor 30 is short-circuited, thus rendering the motor inoperative and enabling manual control of the control surface 31 which, in automatic operation, is governed by said motor. The motor 30 is connected by conduits 32 and 33 to a pressure control valve 34 into which fluid under pressure is admitted at passage 35 and allowed to exhaust through passages 36 and 37. A control slide 34a of valve 34 is positioned according to indications from gyroscope 5, a turn indicator (not shown) and the servo-motor. A schematic diagram of this interconnecting linkage is represented by shafts 38, 39 and 40. The indications from said gyroscope and turn indicator are introduced upon shaft 40 at 40a and 40b, respectively. This linkage operates in a manner known per se and constitutes no part of the invention. The novel pressure short-circuiting means for the above servo-motor apparatus is constituted by passages 41 and 42 which are connected from coupling valve 29 to conduits 32 and 33, respectively. Valve 29 is so constructed that in one position of the pistons 29a and 29b conduits 32 and 33 are in direct communication by means of passages 41 and 42. In this condition, the servo-motor 30 is rendered inoperative because of the short-circuiting of the fluid pressure. However, in the operating position, this communication is interrupted and the pressure agent is permitted to act upon the piston surfaces of the servo-motor.

In operation, assume that the aircraft is flying a steady course with the aid of the automatic control device. The position of the plunger 19 is as shown in Fig. 1 with switch 25 closed and the axes of the gyroscope free. In this condition, solenoid 26, which is connected to a suitable source of electric energy, is energized and armature 27 is held in such a position against the pressure of spring 28 that valve 29 connected therewith permits fluid pressure from the control valve 34 to act upon the servo-motor 30. This is accomplished by preventing communication between passages 41 and 42 through the valve 29. Now assume that an event occurs wherein it is necessary for the pilot to take manual control of the craft and to execute rapid maneuvers. The pilot, by means of knob 20, pulls plunger 19 to the "out" position. In the course of this longitudinal displacement switch 25 is first opened and substantially simultaneously the axes of the gyroscope 5 are fixed. With the opening of the switch 25 the armature 27 of the solenoid 26 influenced by spring 28 is withdrawn from the energized position, thus also moving the pistons of coupling valve 29 to the position shown in Fig. 4. The passages 41, 42 are thereby connected with each other so that the flow of the fluid pressure agent is short-circuited between the servo-motor 30 and the control valve 34. If the control valve 34 should now be operated, the fluid will flow through passages 41 and 42 and no longer actuate the servo-motor. Consequently, with said passages in communication, the pressure agent present in the cylinder of the servo-motor can equalize itself through said passages so that manual control, which will move rudder 31 and thereby forcibly displace the piston of said motor, can be effected without resistance from the automatic apparatus. When the maneuvers are executed and the pilot has again found the course on which it is desired to hold the aircraft, the plunger 19 is thrust inwardly whereupon the above initially described condition will occur and the craft will fly automatically controlled.

There is thus provided a novel device for coordinating the action of a directional gyroscope and an automatic vehicle control apparatus connected therewith. The device provides simplified means for disconnecting said automatic apparatus and at the same time establishing the axes of the gyroscope to preserve the initial directional value set thereon. The device is of rugged construction, light weight, easy in manipulation and rapid in action. The disconnecting means are so constructed that manual control of the vehicle does not meet with resistance from said automatic apparatus.

Although only two embodiments of the invention have been illustrated and described in detail, it is to be expressly understood that the invention is not limited thereto. For example, in the form shown, a contact spring switch 25 is employed for controlling the solenoid 26; however, a lever or a pressure switch or any other suitable type may be used. Various changes may also be made in the design and arrangement of parts illustrated, without departing from the spirit and scope of the invention, as the same will now be understood by those skilled in the art. For a definition of the limits of the invention, reference will be had primarily to the appended claims.

What is claimed is:

1. In apparatus of the class described, a gyroscope, an automatic vehicle control device connected therewith, clamping means including mechanical elements for fixing the axes of said gyroscope, switching means for disabling the automatic control device, and a manually operable plunger directly controlling said mechanical elements for simultaneously acting upon said clamping means and said switching means.

2. In combination, automatic steering mechanism for aircraft and the like, a directional gyroscope for controlling said steering mechanism, means including mechanical elements for establishing the axes of said gyroscope means for rendering said automatic steering mechanism effective and ineffective, electrical means for actuating said last-named means, switching means for controlling said electrical means to render said automatic steering mechanism effective or ineffective, and manually operable means for simultaneously actuating said mechanical elements and said switching means to render said automatic steering mechanism ineffective and to simultaneously establish the axes of said gyroscope.

3. In combination, automatic means for actuating a surface of an aircraft, a gyroscope for controlling said automatic means, means including mechanical elements for fixing the axes of said gyroscope, means for rendering said automatic means effective and ineffective, electrical means for actuating said last-named means, switching means for controlling said electrical means to render said steering mechanism effective or ineffective, and a manually operable plunger directly controlling said mechanical elements for simultaneously actuating said fixing means and said switching means to render said automatic means ineffective and to simultaneously fix the axes of said gyroscope.

4. In combination, an aircraft control surface, a fluid pressure operated servo-motor connected to said control surface for actuating the same, means for supplying fluid pressure to said servo-motor, a control valve for regulating the fluid pressure supplied to said servo-motor, a gyroscope for controlling said control valve, means for by-passing said fluid pressure to render said servo-motor ineffective, electrical means for actuating said by-pass means, means including mechanical elements for fixing the axes of said gyroscope, switching means for controlling said by-pass actuating means, and manually operable means directly controlling said mechanical elements for simultaneously actuating said fixing means and said switching means, whereby the axes of said gyroscope are fixed when said servo-motor is ineffective.

HEINRICH ROLAND.
JOHANNES THIRY.